(12) United States Patent
Fan et al.

(10) Patent No.: US 10,489,844 B2
(45) Date of Patent: Nov. 26, 2019

(54) METHOD, APPARATUS, AND SYSTEM FOR PROCESSING SERVICES

(71) Applicant: TENCENT TECHNOLOGY (SHENZHEN) COMPANY LIMITED, Guangdong (CN)

(72) Inventors: Ke Fan, Guangdong (CN); Xunmao Zheng, Guangdong (CN); Yang Li, Guangdong (CN); Bingjie Chen, Guangdong (CN); Qi Ma, Guangdong (CN); Jun Han, Guangdong (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 498 days.

(21) Appl. No.: 14/932,041

(22) Filed: Nov. 4, 2015

(65) Prior Publication Data
US 2016/0055570 A1 Feb. 25, 2016

Related U.S. Application Data

(63) Continuation of application No. PCT/CN2014/075871, filed on Apr. 22, 2014.

(30) Foreign Application Priority Data

May 22, 2013 (CN) .......................... 2013 1 0194280

(51) Int. Cl.
*G06Q 30/00* (2012.01)
*G06Q 30/06* (2012.01)
(Continued)

(52) U.S. Cl.
CPC ......... *G06Q 30/0631* (2013.01); *G06Q 20/08* (2013.01); *G06Q 20/12* (2013.01)

(58) Field of Classification Search
CPC ....................................................... G06Q 30/06
(Continued)

(56) References Cited

U.S. PATENT DOCUMENTS 8,538,788 B1 * 9/2013 Spiegel ................. G06Q 10/06
705/7.11
2010/0082462 A1   4/2010 Yuan et al.
(Continued)

FOREIGN PATENT DOCUMENTS

CN            1841419 A       10/2006
CN         101295394 A       10/2008
(Continued)

OTHER PUBLICATIONS

Communication dated Dec. 9, 2016, issued by the State Intellectual Property Office of the P.R.C. in corresponding Chinese Application No. 201310194280.X.
(Continued)

*Primary Examiner* — Mila Airapetian
(74) *Attorney, Agent, or Firm* — Sughrue Mion, PLLC

(57) ABSTRACT

Disclosed are a method, apparatus and system for processing services. The method includes: receiving a service processing request from a front-end equipment; determining a recommended service processing channel according to the information about the service to be processed, and acquiring content of the recommended service processing channel; sending the content of the recommended service processing channel to the front-end equipment such that the front-end equipment displays the content of the recommended service processing channel; and receiving a service acknowledgment from the front-end equipment, and processing the service to be processed according to the service acknowledgment. With these technical solutions, the number of service processing channels displayed by the front-end (Continued)

equipment is reduced, and thus the time required to process services is reduced and the probability of processing services successfully is increased.

11 Claims, 9 Drawing Sheets

(51) Int. Cl.
*G06Q 20/12* (2012.01)
*G06Q 20/08* (2012.01)

(58) Field of Classification Search
USPC .......................................... 705/26.1
See application file for complete search history.

(56) References Cited

U.S. PATENT DOCUMENTS

| | | | | |
|---|---|---|---|---|
| 2010/0211499 | A1* | 8/2010 | Zanzot | G06Q 20/10 |
| | | | | 705/40 |
| 2011/0029400 | A1* | 2/2011 | Scipioni | G06F 21/36 |
| | | | | 705/26.4 |
| 2012/0041879 | A1* | 2/2012 | Kim | G06Q 20/40 |
| | | | | 705/44 |
| 2012/0191533 | A1* | 7/2012 | Bennett | G06Q 30/0207 |
| | | | | 705/14.43 |
| 2013/0110678 | A1* | 5/2013 | Vigier | G06Q 30/06 |
| | | | | 705/26.61 |
| 2013/0159081 | A1* | 6/2013 | Shastry | G06Q 30/0274 |
| | | | | 705/14.23 |
| 2014/0052616 | A1* | 2/2014 | Choi | G06Q 20/02 |
| | | | | 705/39 |

FOREIGN PATENT DOCUMENTS

| | | |
|---|---|---|
| CN | 102867252 A | 1/2013 |
| SG | 187283 A1 | 2/2013 |

OTHER PUBLICATIONS

International Search Report for PCT/CN2014/075871 dated Jul. 18, 2014 [PCT/ISA/210].

* cited by examiner

Order

Order No. _____

Order Content _____

Account Payable _____

CONFIRM

METHOD, APPARATUS, AND SYSTEM FOR PROCESSING SERVICES

This application is a continuation of international application No. PCT/CN2014/075871, filed on Apr. 22, 2014, which claims priority to Chinese Patent Application No. 201310194280.X, filed before Chinese Patent Office on May 22, 2013 and entitled "METHOD, APPARATUS AND SYSTEM FOR PROCESSING SERVICES", which is incorporated herein by reference in its entity.

TECHNICAL FIELD

The present disclosure relates to the technical field of information processing, and in particular, to a method, apparatus and system for processing services.

BACKGROUND

With the development of the Internet, processing services via the Internet has become one of the main ways of processing services. However, the type of service processing channels is increasing with the increase of the type of services and the number of service providers. The service processing channels are regarded as all ways to process a certain service. For example, for a payment service, channels for processing the payment service may include a virtual currencypayment channel, a Tenpay payment channel, an Alipay payment channel, a QuickPay payment channel, and the like Among the many service processing channels, an appropriate method for processing services may reduce the time required to select a service processing channel, and thus the time required to process services is reduced and the probability of processing services successfully is increased.

In an existing method for processing services, a system will display to a user all channels capable of processing services in a service processing channel interface. The user needs to select a service processing channel from numerous service processing channels provided by the system, and then enter the flow of the selected service processing channel to complete the service processing.

During the implementation of the present disclosure, the inventor found that the above service processing method has at least the following disadvantages:

Due to the diversification of service processing channels and more and more service processing channels displayed in a service processing channel interface, it is very difficult to clearly show via the service processing channel interface only the difference between various transaction channels and the conditions required by each service processing channel to process services, such that a user finds that the service processing can not be completed via the selected service processing channel in most cases after accessing to a certain service processing channel, and needs to return to the service processing channel interface to reselect a service processing channel. This increases the time required to process services and reduces the probability of processing services successfully.

SUMMARY

In view of the above, embodiments of the present disclosure provide a method, apparatus and system for processing services. The following technical solutions are employed.

In a first aspect, a method for processing services is provided, including:

receiving a service processing request from a front-end equipment for processing services, the service processing request carrying information about a service to be processed;

determining a recommended service processing channel according to the information about the service to be processed, and acquiring the content of the recommended service processing channel;

sending the content of the recommended service processing channel to the front-end equipment such that the front-end equipment displays the content of the recommended service processing channel; and receiving a service acknowledgment from the front-end equipment, and processing the service to be processed according to the service acknowledgment.

In a second aspect, an apparatus for processing services is provided, applicable to a rear-end equipment for processing services. The apparatus includes:

a first receiving module, configured to receive a service processing request from a front-end equipment for processing services, the service processing request carrying information about a service to be processed;

a determining module, configured to determine a recommended service processing channel according to the information about the service to be processed received by the first receiving module;

an acquiring module, configured to acquire content of the recommended service processing channel determined by the determining module;

a first sending module, configured to send the content of the recommended service processing channel acquired by the acquiring module to the front-end equipment such that the front-end equipment displays the content of the recommended service processing channel;

a second receiving module, configured to receive a service acknowledgment from the front-end equipment; and a processing module, configured to process the service to be processed according to the service acknowledgment received by the second receiving module.

In a third aspect, a method for processing services is provided, including:

acquiring information about a service to be processed, and sending a service processing request to a rear-end equipment for processing services, the service processing request carrying the information about the service to be processed;

receiving content of a recommended service processing channel from the rear-end equipment, and displaying the content of the recommended service processing channel; and acquiring a service acknowledgment, and sending the service acknowledgment to the rear-end equipment such that the rear-end equipment processes the service to be processed according to the service acknowledgment.

In a fourth aspect, an apparatus for processing services is provided, applicable to a front-end equipment for processing services. The apparatus includes:

a first acquiring module, configured to acquire information about a service to be processed;

a first sending module, configured to send a service processing request to a rear-end equipment for processing services, the service processing request carrying information about the service to be processed;

a first receiving module, configured to receive content of a recommended service processing channel from the rear-end equipment;

a display module, configured to display the content of the recommended service processing channel;

a second acquiring module, configured to acquire a service acknowledgment; and a second sending module, configured to send the service acknowledgment acquired by the second acquiring module to the rear-end equipment, such that the rear-end equipment processes the service to be processed according to the service acknowledgment.

In a fifth aspect, a system for processing services is provided, including a rear-end equipment for processing services and a front-end equipment for processing services.

A first apparatus for processing services runs in the rear-end equipment for processing services, and a second apparatus for processing services runs in the front-end equipment for processing services. The first apparatus for processing services is the apparatus as described in the second aspect. The second apparatus for processing services is the apparatus as described in the fourth aspect.

The technical solutions according to the embodiments of the present disclosure create the following beneficial effects:

By determining a recommended service processing channel according to information about a service to be processed, and then sending the content of the recommended service processing channel to the front-end equipment such that the front-end equipment displays the content of the recommended service processing channel, the number of service processing channels displayed by the front-end equipment is reduced, and thus the time required to process services is reduced and the probability of processing services successfully is increased.

BRIEF DESCRIPTION OF THE DRAWINGS

To describe the technical solutions in the embodiments of the present disclosure more clearly, the accompanying drawings to be used for describing the embodiments will be briefly introduced as below. Apparently, the accompanying drawings in the following description show merely some embodiments of the present disclosure, and persons of ordinary skill in the art may still derive other drawings from these accompanying drawings without creative efforts.

FIG. 5 is a schematic diagram of a third-party order according to an embodiment of the present disclosure;

DETAILED DESCRIPTION

To make the technical solutions and advantages of the present disclosure clearer, the embodiments of the present disclosure will be further described as below in detail with reference to the accompanying drawings.

Figure 1:
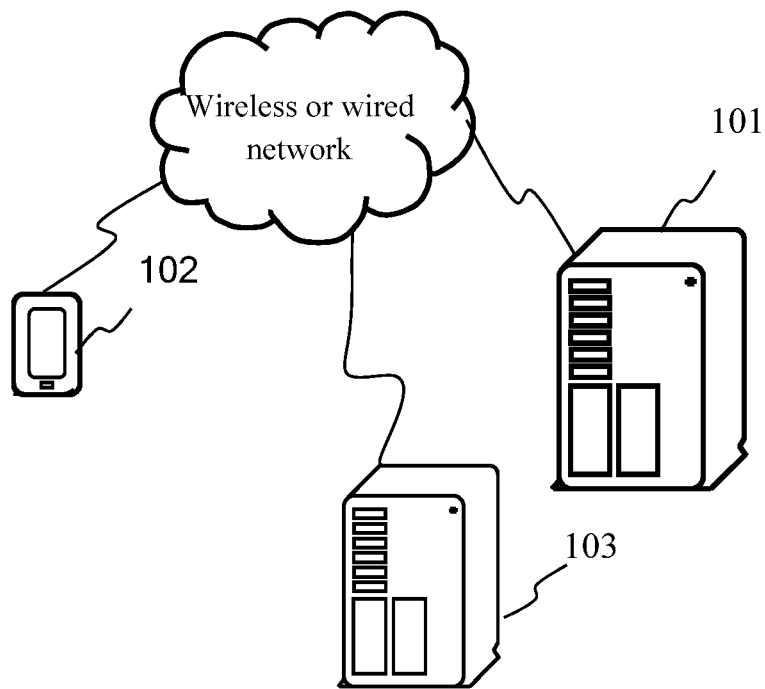
FIG. 1 is a schematic structural diagram of an implement environment of a method for processing services according to an embodiment of the present disclosure.

An embodiment of the present disclosure provides a method for processing services. Referring to FIG. 1, a schematic structural diagram of an implement environment of a method for processing services according to an embodiment of the present disclosure is illustrated. The implement environment includes a rear-end equipment 101 for processing services, a front-end equipment 102 for processing services and a third-party service provider 103.

A first apparatus for processing services runs in the rear-end equipment 101 for processing services. The first apparatus for processing services is an apparatus for processing services as illustrated in an embodiment described hereinafter. In addition, the rear-end equipment 101 for processing services may be a rear-end server, configured to combine with the third-party service provider 103 and the front-end equipment 102 for processing services to provide service processing services for users.

A second apparatus for processing services runs in the front-end equipment 102 for processing services. The second apparatus for processing services is an apparatus for processing services as illustrated in an embodiment described hereinafter. In addition, the front-end equipment 102 for processing services may be a smartphone, a tablet computer, an e-book reader, a Moving Picture Experts Group Audio Layer III (MP3) player, a Moving Picture Experts Group Audio Layer IV (MP4) player, a portable laptop computer, a desktop computer, and the like.

The third-party service provider 103 may be a rear-end server provided by a third service provider, and the third-party service provider 103 may combine with the rear-end equipment 101 for processing services and the front-end equipment 102 for processing services to serve the users in processing services via a third-party application.

The rear-end equipment 101 for processing services, the third-party service provider 103 and the front-end equipment 102 for processing services may communicate with each other over a wireless or wired network.

Figure 2:
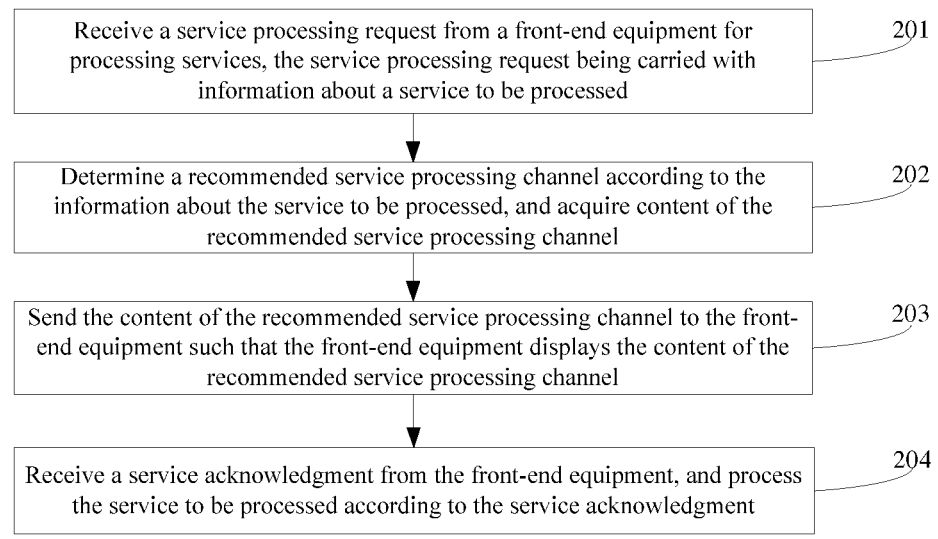
FIG. 2 is a flowchart of a method for processing services according to an embodiment of the present disclosure.

In combination with the above implementation environment, an embodiment of the present disclosure provides a method for processing services. Referring to FIG. 2, the method according to this embodiment includes the following steps:

Step 201: receiving a service processing request from a front-end equipment for processing services, the service processing request carrying information about a service to be processed;

Step 202: determining a recommended service processing channel according to the information about the service to be processed, and acquiring the content of the recommended service processing channel;

Step 203: sending the content of the recommended service processing channel to the front-end equipment such that the front-end equipment displays the content of the recommended service processing channel; and Step 204: receiving a service acknowledgment from the front-end equipment, and processing the service to be processed according to the service acknowledgment.

Figure 3:
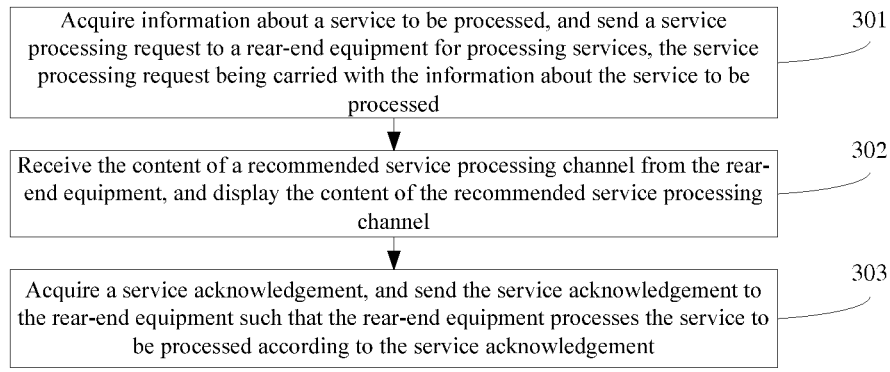
FIG. 3 is a flowchart of another method for processing services according to an embodiment of the present disclosure.

This embodiment further provides another method for processing services. Referring to FIG. 3, the method includes the following steps:

Step 301: acquiring information about a service to be processed, and sending a service processing request to a rear-end equipment for processing services, the service processing request carrying the information about the service to be processed;

Step 302: receiving the content of a recommended service processing channel from the rear-end equipment, and displaying the content of the recommended service processing channel; and Step 303: acquiring a service acknowledgment, and sending the service acknowledgment to the rear-end equipment such that the rear-end equipment processes the service to be processed according to the service acknowledgment.

In the methods according to this embodiment, by determining a recommended service processing channel according to information about a service to be processed, and then sending the content of the recommended service processing channel to the front-end equipment such that the front-end equipment displays the content of the recommended service processing channel, the number of service processing channels displayed by the front-end equipment is reduced, and thus the time required to process services is reduced and the probability of processing services successfully is increased.

For a clearer description of a method for processing services according to the above embodiment, using an embodiment blow as example, the method for processing services will be described in detail in combination with the content of the above embodiment.

Figure 4:
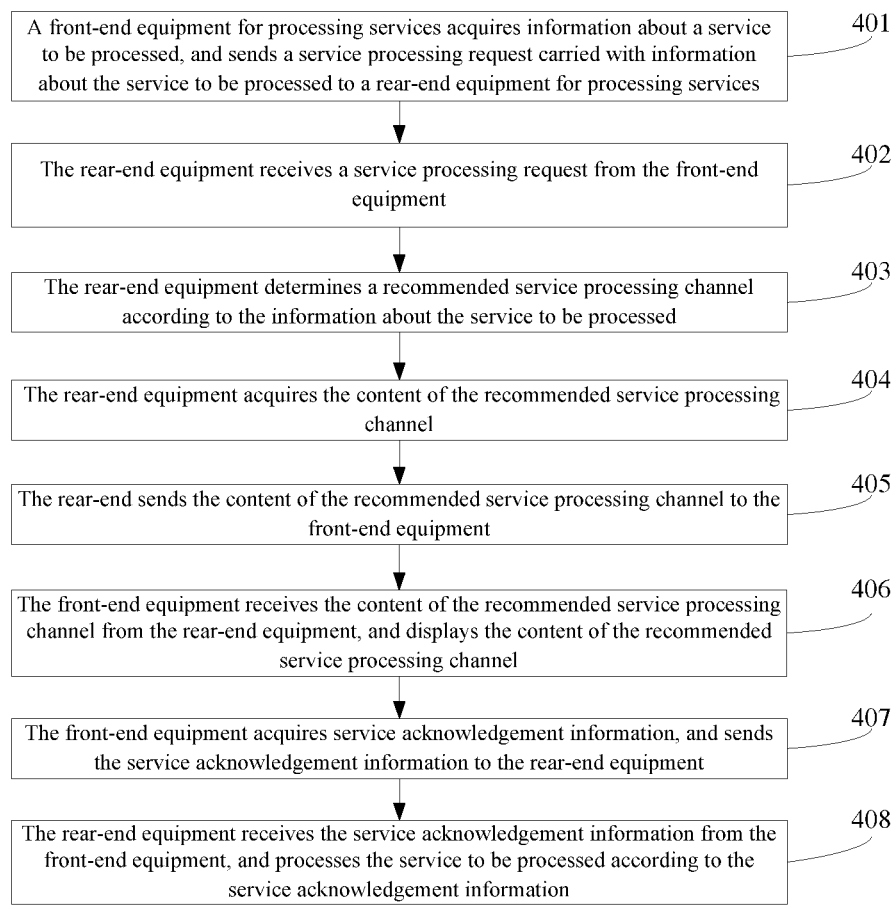
FIG. 4 is a flowchart of a method for processing services according to an embodiment of the present disclosure.

In combination with the implementation environment as illustrated in FIG. 1 and the content of the above-described embodiment, an embodiment of the present disclosure provides a method for processing services. Referring to FIG. 4, the method according to this embodiment includes following steps:

Step 401: A front-end equipment for processing services acquires information about a service to be processed, and sends a service processing request carried with information about a service to be processed to a rear-end equipment for processing services.

In this step, the front-end equipment for processing services may be equipment capable of communicating with a server over a network. For example, the front-end equipment for processing services may be a personnel computer capable of surfing the Internet, or a smartphone capable of surfing the Internet, and the like. The specific product form of the front-end equipment for processing services will not be limited in this embodiment. The rear-end equipment for processing services may be equipment communicating with the front-end equipment over a network. For example, the rear-end equipment may be a server, and the like. The specific product form of the rear-end equipment for processing services will not be limited in this embodiment.

In addition, the specific ways for the front-end equipment to acquire information about a service to be processed will not be limited in this embodiment. For example, the front-end equipment acquires service selected by a user in a service processing interface, then determines this service as service to be processed, and determines information about the service to be processed according to the acquired service to be processed.

Besides, the information about a service to be processed at least contains the amount of money required by the service to be processed and the content of the service to be processed. The information about a service to be processed is different according to different services to be processed. The specific service to be processed and information thereof will not be limited in this embodiment. Using the service to be processed being BUY as example, information about BUY service includes, but is not limited to, content, amount, merchant, and the like.

Specifically, using the service to be processed is a BUY service where a user wants to buy RMB 100 of commodity A as an example, the front-end equipment determines that information about the BUY service includes content and amount according to the BUY service where a user wants to buy RMB 100 of commodity A, where the content is commodity A and the amount is RMB 100. Nevertheless, the service to be processed may also be TOP-UP or others. The service to be processed will not be limited in this embodiment. The content may also be commodity B or other contents other than commodity A. The specific content will not be limited in this embodiment. The amount may also be RMB 200 or other amounts other than RMB 100. The specific amount will not be limited in this embodiment.

Moreover, besides information about the service to be processed, the service processing request is also required to carry a user identifier capable of identifying the identity of a user who applies for the service to be processed. In addition, the service processing request may also be carried with other contents. The specific contents carried in the service processing request will not be limited in this embodiment. Wherein, the user identifier carried in the service processing request is used for enabling the rear-end equipment for processing services to determine user information according to the user identifier and then recommend a service processing channel suitable for the service to be processed, applied by the user, according to the user information. The specific form of the user identifier will not be limited in this embodiment. For example, the user identifier is the user name and password when a user logs in, or a user identifier (ID) number. The specific way to acquire the user identifier will not be limited in this embodiment. For example, if a user has been logged in to, the user identifier may be acquired according to the login information; and if a user has not yet been logged in to, a login window may be popped up to require the user to fill in the login information to log in, and then the user identifier is acquired according to the login information.

Step 402: The rear-end equipment receives a service processing request from the front-end equipment.

Wherein, the service processing request at least carries information about a service to be processed and the user identifier.

Step 403: The rear-end equipment determines a recommended service processing channel according to the information about the service to be processed.

In this step, as the rear-end equipment will record all user information and also the correspondence between the each piece of user information and the user identifier at the same time. Therefore, the rear-end equipment can determine the user information corresponding to the user identifier carried in the service processing request according to the correspondence between the user information and the user identifier.

Meanwhile, the rear-end equipment will record the available service processing channels. Therefore, the rear-end equipment searches a channel, matching the service information carried in the service processing request, from the recorded service processing channels according to the user information, and uses the searched channel as the recommended service processing channel. The existing service processing channels will not be limited in this embodiment. Using the payment service channel as an example, the existing channels for processing the payment service include a virtual currency payment channel, a Tenpay payment channel, an Alipay payment channel, a QuickPay payment channel, and the like.

In addition, the specific ways to search a channel matching the service information carried in the service processing request from the recorded service processing channels according to the user information will not be limited in this embodiment. The searching includes, but is not limited to, the following steps:

Step 1: A service processing channel is selected from the recorded service processing channels.

In step 1, an order of the existing service processing channels is determined according to user's habits, preset default rules or the balance of the existing service processing channels, and a service processing channel is selected from the existing service processing channels according to the order of the existing service processing channels. The specific preset default rules will not be limited in this embodiment. The default rules include, but are not limited to, selecting a service processing channel according to a descending order of correlations between the service processing channels and the service to be processed.

Specifically, if the service to be processed is BUY, information about the service to be processed includes content and amount, where: the content is commodity A; the amount is RMB 100; the service processing channel is a payment service processing channel; the user information is information about user C; and the recorded payment service processing channel is a virtual currency payment channel provided by the commercial platform, a Tenpay payment channel and a QuickPay payment channel. Because a user buys commodity A from the commercial platform, the virtual currency payment channel provided by the commercial platform is set to be the most relevant to the BUY service, then the Tenpay payment channel is set to be relatively relevant to the BUY service, and the QuickPay payment channel is set to be generally relevant to the BUY service. Therefore, selection may be made according to the order of the virtual currency payment channel, the Tenpay payment channel and the QuickPay payment channel.

Nevertheless, in this step, in addition to the selection manner mentioned above, a service processing channel may also be selected at random from the recorded service processing channels. Selecting in which way will not be specifically limited in this embodiment.

Step 2: It is judged whether the currently selected service processing channel matches the information about the service to be processed according to the user information.

In this step, in practical implementation, it may be determined as whether an attribute value in the user information corresponding to the currently selected service processing channel can meet the requirement of the information about the service to be processed.

Specifically, supposing that the virtual currency payment channel is currently selected as the service processing channel in step 1 and the attribute value corresponding to the service information is a virtual currency value, it is determined whether the virtual currency value corresponding to the virtual currency in the information about user C can meet the amount contained in the information about the BUY service.

Further, the result of judging whether the currently selected service processing channel matches the information about the service to be processed according to the user information may be one of the following two results of judgment:

First result of judgment: the currently selected service processing channel matches the information about the service to be processed.

During the practical implementation, if the attribute value in the user information corresponding to the currently selected service processing channel can meet the requirement of the information about the service to be processed, it is determined that the currently selected service processing channel matches the information about the service to be processed.

With regard to the first result of judgment, the rear-end equipment stops searching and uses the channel matching the information about the service to be processed as a recommended service processing channel.

Specifically, still using the virtual currency payment channel being selected currently as the service processing channel in step 1 as an example, if the virtual currency value corresponding to the virtual currency in the information about user C, equivalent to RMB 150, is sufficient to pay the amount RMB 100 to be paid for the BUY service, it is judged that the virtual currency payment channel matches the information about the BUY service. Therefore, searching for other service processing channels is stopped, and the virtual currency payment channel is used as the recommended service processing channel. Nevertheless, the virtual currency value may also be in other numerical values and units. The specific form of the virtual currency value will not be limited in this embodiment.

Second result of judgment: the currently selected service processing channel does not match the information about the service to be processed.

During the practical implementation, if the attribute value in the user information corresponding to the currently selected service processing channel does not meet the requirement of the information about the service to be processed, it is determined that the currently selected service processing channel does not match the information about the service to be processed.

With regard to the second result of judgment, a specific implementation includes, but is not limited to, the following steps: the rear-end equipment continues to search a next service processing channel until a service processing channel matching the information about the service to be processed is searched, and uses the channel matching the information about the service to be processed as the recommended service processing channel. If all service processing channels are not matching the information about the service to be processed, it is determined whether there is a historical service processing channel of the user recorded in the user information. If there is a historical service processing channel of the user recorded in the user information, the historical service processing channel of the user is used as the recommended service processing channel. If all service processing channels are not matching the information about the service to be processed, and there is no historical service processing channel of the user recorded in the user information, a default service processing channel is used as the recommended service processing channel. The specific way of determining a default service processing channel will not be limited in this embodiment, including but not limited to the following: if the system has recorded the probability of successfully processing services of service processing channels selected by each user, determining a service processing channel with the highest successful probability according to the recorded successful probability of processing services of the service processing channels selected by each user, and determining the service processing channel with the highest successful probability as the default service processing channel.

Specifically, still using the virtual currency payment channel being selected currently as the service processing channel in step 1 as example, if the virtual currency value corresponding to the virtual currency in the information about user C, equivalent to RMB 50, is insufficient to pay the amount RMB 100 required for the BUY service, it is judged that the virtual currency payment channel does not match the information about the BUY service. Therefore, the rear-end equipment continues to search a next service processing channel. Using the next searched service processing channel being Tenpay payment channel as example, the rear-end equipment continues to judge whether the Tenpay payment channel matches the information about the BUY service. If the Tenpay payment channel does not match the information about the BUY service, the rear-end equipment continues to search. Using the service processing channel searched this time being QuickPay payment channel as example, if the QuickPay payment channel does not match the information about the BUY service, it is determined whether there is a historical service processing channel of user C recorded in the information about user C. If there is not a historical service processing channel of user C recorded in the information about user C, bank payment channel, a default service processing channel, is used as the recommended service processing channel.

Step 404: The rear-end equipment acquires the content of the recommended service processing channel.

In this step, because the rear-end equipment has determined the recommended service processing channel in step 303, the rear-end equipment further acquires the content of the recommended service processing channel in this step.

During the practical implementation, the service processing channels may be categorized into two types: service processing channels provided by a third party and service processing channels not provided by a third party, for example, service processing channels provided by the system itself. The way to acquire the content of a recommended service processing channel is different due to type of the recommended service processing channel. The way to acquire the content of a recommended service processing channel will not be limited in this embodiment, including but not limited to one of the following:

First way: if the recommended service processing channel is a service processing channel not provided by a third party, the rear-end equipment directly acquires parameters required by the recommended service processing channel from the equipment on which the recommended service processing channel is hosted, and uses the parameters as the content of the recommended service processing channel.

Specifically, using the recommended service processing channel being a virtual currency payment channel and the equipment on which the recommended service processing channel is hosted being a server as example, because the virtual currency payment channel is a service processing channel not provided by a third party, the rear-end equipment may directly acquire the virtual currency value of the virtual currency payment channel, the validity period of the virtual currency and other contents from the related databases of the server. In addition, the acquired content of the virtual currency payment channel may also be other contents, which will not be limited in this embodiment.

Second way: if the recommended service processing channel is a service processing channel provided by a third party, the rear-end equipment establishes connection with the third party via a cross-domain message interface, and acquires the content of the recommended service processing channel from the third party. During the practical implementation, the rear-end equipment may negotiate a message protocol with the third party via the connection established with the third party, then place an empty order to the third party according to the message protocol, and acquire an URL distributed by the third party to the empty order. The URL distributed by the third party to the empty order is regarded as the content of the recommended service processing channel.

Specifically, using the recommended service processing channel being a Tenpay payment channel as example, because the Tenpay payment channel is a service processing channel provided by a third party, the rear-end equipment establishes connection with a payment center of Tenpay via a cross-domain message interface, negotiates a message protocol with the payment center of Tenpay via this connection, places an empty order to the payment center of Tenpay according to the message protocol, and acquires URL 1 distributed by the third party to the empty order. URL 1 is regarded as the content of the recommended service processing channel acquired from the payment center of Tenpay.

Step 405: The rear-end equipment sends the content of the recommended service processing channel to the front-end equipment.

In this step, the specific way for the rear-end equipment to send the content of the recommended service processing channel to the front-end equipment will not be limited in this embodiment, including but not limited to the following: the rear-end equipment stores the content of the recommended service processing channel in a service processing channel content file, and then sends this file to the front-end equipment.

Step 406: The front-end equipment receives the content of the recommended service processing channel from the rear-end equipment, and displays the content of the recommended service processing channel.

In this step, the specific way for the front-end equipment to receive the content of the recommended service processing channel from the rear-end equipment will not be limited in this embodiment, including but not limited to the following: the front-end equipment receives the service processing channel content file describing the content of the recommended service processing channel from the rear-end equipment, and acquires the content of the recommended service processing channel from this file.

In addition, because the content of the recommended service processing channel received from the rear-end equipment is categorized into two types according to whether the recommended service processing channel is a service processing channel provided by a third party, there are the following two ways for the front-end equipment to display the content according to the specific type of the received content of the recommended service processing channel.

First display way: if the content of the recommended service processing channel received by the front-end equipment is an URL, the front-end equipment determines that the content of the recommended service processing channel is the content of a channel provided by a third party, embeds the order content corresponding to the URL into the current display interface for display, and fills corresponding content into the corresponding order content according to the information about the service to be processed.

Second display way: if the content of the recommended service processing channel received by the front-end equipment is not an URL, the front-end equipment determines that the content of the recommended service processing channel is the content of a channel not provided by a third channel, then displays the content of the recommended service processing channel, and fills corresponding content into the corresponding content of the recommended service processing channel according to the information about the service to be processed.

Figure 6:
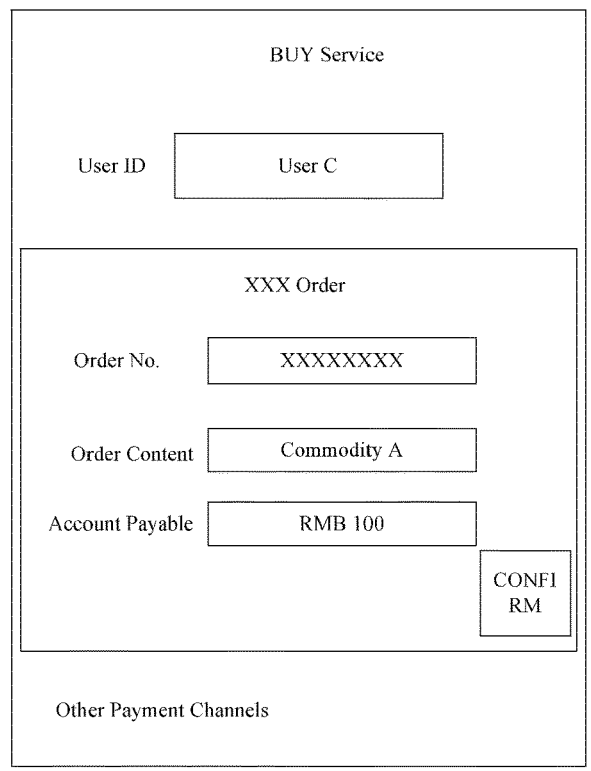
FIG. 6 is a schematic diagram of a content display interface of a recommended service processing channel according to an embodiment of the present disclosure.
Figure 6:
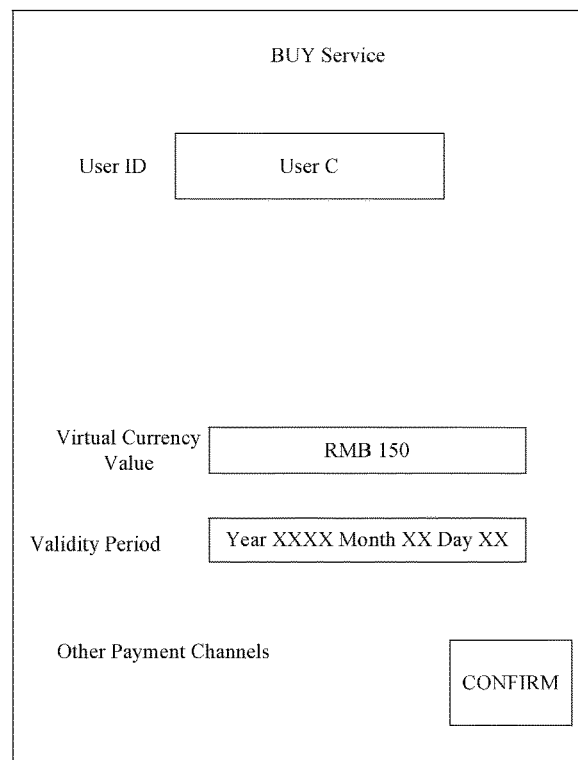

Specifically, if the content of the recommended service processing channel received by the front-end equipment is URL 1, the order content of which is as illustrated in FIG. 5, the front-end equipment determines that the content of the recommended service processing channel is the content of a channel provided by a third party. The corresponding order content in FIG. 5 is embedded into the current display interface for display, and the corresponding content is filled in the corresponding order content according to the information about the service to be processed, as illustrated in FIG. 6(*a*). If the content of the recommended service processing channel received by the front-end equipment is a virtual currency value or the validity period of the virtual currency, the front-end equipment displays the content of the recommended service processing channel, and fills corresponding content in the corresponding content of the recommended service processing channel according to the information about the service to be processed, as illustrated in FIG. 6(*b*).

It should be noted that, in addition to displaying the content of the recommended service processing channel, the current display interface further provides a function of changing the service processing channels in order to meet the user's diverse requirements of the current service processing.

Step 407: The front-end equipment acquires service acknowledgement information, and sends the service acknowledgement information to the rear-end equipment.

In this step, the front-end equipment acquires the content corresponding to a selection operation and the content corresponding to an input operation carried out in the interface displaying the content of the recommended service processing channel, and uses the content selected and the content input by the user as service acknowledgement information to send to the rear-end equipment after the user confirms to process the service.

408: The rear-end equipment receives the service acknowledgement information from the front-end equipment, and processes the service to be processed according to the service acknowledgement information.

In this step, the rear-end equipment receives the service acknowledgement information from the front-end equipment, and correspondingly fills the contents in the service acknowledgement information into the contents required to be filled by the service processing flow so as to complete the service processing flow.

Further, the method according to this embodiment further includes a step that the rear-end equipment judges whether the service acknowledgement information is correct, to avoid the service processing failure via the recommended service processing channel, resulted from wrong content filled or selected by the user. The specific method for judging whether the service acknowledgement information is correct will not be limited in this embodiment, including but not limited to the following: judging whether the content in the service acknowledgement information is the same as that in the service processing request received in step 402; determining that the service acknowledgement information is correct if the content in the service acknowledgement information is the same as that in the service processing request received in step 402; and determining that the service acknowledgement information is incorrect if the content in the service acknowledgement information is not the same as that in the service processing request received in step 402.

If the service acknowledgement information is correct, the rear-end equipment processes the service to be processed according to the service acknowledgement information, and sends a service processing response to the front-end equipment for processing services. If the service acknowledgement information is incorrect, the rear-end equipment sends error information corresponding to the service acknowledgement information to the front-end equipment for processing services.

Correspondingly, upon receiving the service processing response from the rear-end equipment, the front-end equipment displays the service processing response to notify the user that the service has been processed successfully.

Upon receiving the error information corresponding to the service acknowledgement information from the rear-end equipment, the front-end equipment displays the error information to notify the user that the processing of the service has not been completed and why it has not been completed. The user may modify the wrong contents according to the error information displayed by the front-end equipment, and confirms to process the service. The front-end equipment will perform step 407 again after receiving an instruction that the user confirms to process the service, and the rear-end equipment will perform step 408 again at the same moment. The cycle is repeated until the service is processed successfully.

In the method according to this embodiment, by determining a recommended service processing channel according to information about a service to be processed, and then sending the content of the recommended service processing channel to the front-end equipment such that the front-end equipment displays the content of the recommended service processing channel, the number of service processing channels displayed by the front-end equipment is reduced, and thus the time required to process services is reduced and the probability of processing services successfully is increased.

Figure 7:
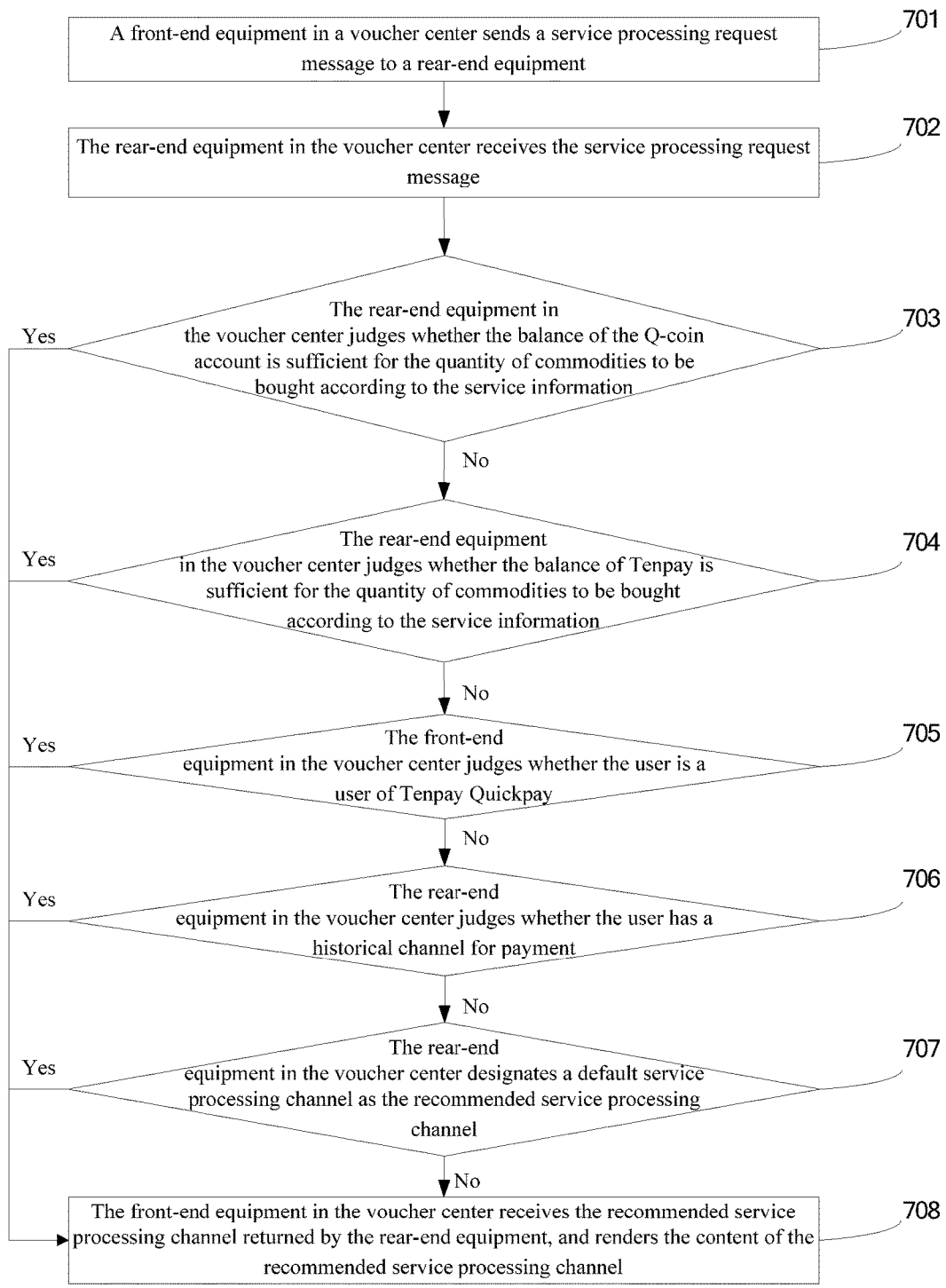
FIG. 7 is a flowchart of a method for processing services according to an embodiment of the present disclosure.

An embodiment of the present disclosure provides a method for processing services. To better describe the method according to this embodiment, using the service to be processed being buy of commodities for Yellow Diamond VIPs in a voucher center, the page of the service to be processed being a page of buying commodities for Yellow Diamond VIPs, and the service processing channel being a Q-coin payment channel, a Tenpay payment channel, an Alipay payment channel, a Tenpay QuickPay payment channel as example, referring to FIG. 7, the flow of the method according to this embodiment specifically includes the following steps:

Step 701: A front-end equipment in the voucher center sends a service processing request message to a rear-end equipment.

In this step, the front-end equipment in the voucher center acquires information, such as, codes of commodities to be bought, quantity of commodities to be bought, and amount of money for commodities to be bought in the page of commodities for Yellow Diamond VIPs, and user identifier, and then sends the service processing request message carrying the service information to the rear-end equipment in the voucher center. The way to send the service processing request message will not be limited in this embodiment. For example, the service processing request message may be sent asynchronously.

Step 702: The rear-end equipment in the voucher center receives the service processing request message.

In this step, after receiving the service processing request message, the rear-end equipment in the voucher center acquires the service information carried in the service processing request message, and then selects a recommended service processing channel according to the acquired service information. Meanwhile, the rear-end equipment in the voucher center will determine related information of a user according to the user identifier in the service information. The specific related information of a user will not be limited in this embodiment, for example, a historical payment channel of the user, the balance of the Q-coin account of the user, the balance of Tenpay of the user, whether or not the user is a user of Quickpay, and the like.

Step 703: The rear-end equipment in the voucher center judges whether the balance of the Q-coin account is sufficient for the amount of money for commodities to be bought according to the service information, performs step 708 if the balance of the Q-coin account is sufficient for the amount of money for commodities to be bought, or performs step 704 if the balance of the Q-coin account is insufficient for the amount of money for commodities to be bought.

In this step, as the service information contains the amount of money for commodities to be bought and the balance of the Q-coin account of the user is determined in step 702, it may be determined as whether the balance of the Q-coin account is insufficient for the amount of money for commodities to be bought contained in the service information. If the balance of the Q-coin account is sufficient for the amount of money for commodities to be bought, the rear-end equipment in the voucher center determines the Q-coin payment channel as the recommended service processing channel, returns the recommended service processing channel to the front-end equipment in the voucher center and performs step 708. If the balance of the Q-coin account is insufficient for the amount of money for commodities to be bought, the rear-end equipment in the voucher center performs step 704 to continue to determine a recommended service processing channel from other payment channels.

Step 704: The rear-end equipment in the voucher center judges whether the balance of Tenpay is sufficient for the amount of money for commodities to be bought according to the service information, performs step 708 if the balance of the Tenpay is sufficient for the quantity of commodities to be bought or performs step 705 if the balance of the Tenpay is insufficient for the quantity of commodities to be bought.

In this step, as the balance of Tenpay is determined in step 702, it may be determined as whether the balance of Tenpay of the user is sufficient for the amount of money for commodities to be bought contained in the service information. If the balance of Tenpay is sufficient for the quantity of commodities to be bought, the rear-end equipment in the voucher center determines the Tenpay payment channel as the recommended service processing channel, returns the recommended service processing channel to the front-end equipment in the voucher center and then performs step 708. If the balance of Tenpay is insufficient for the amount of money for commodities to be bought, the rear-end equipment in the voucher center performs step 705 in order to continue to determine a recommended service processing channel from other payment channels.

Step 705: The front-end equipment in the voucher center judges whether the user is a user of Tenpay Quickpay, performs step 708 if the user is a user of Tenpay Quickpay, or performs step 706 if user is not a user of Tenpay Quickpay.

In this step, as whether or not the user is a user of Tenpay Quickpay is judged in step 702, if the user is determined to be a user of Tenpay Quickpay in step 702, the rear-end equipment in the voucher center determines the Tenpay Quickpay payment channel as the recommended service processing channel, returns the recommended service processing channel to the front-end equipment in the voucher center, and performs step 708; and if the user is determined not to be a user of Tenpay Quickpay in step 702, the rear-end equipment in the voucher center performs step 706 in order to continue to determine a recommended service processing channel from other payment channels.

Step 706: The rear-end equipment in the voucher center judges whether the user has a historical channel for payment, performs step 708 if the user has a historical channel for payment, or performs step 707 if the user has no historical channel for payment.

With regard to this step, as whether or not the user has a historical channel for payment is judged in step 702, if the user is judged to have a historical channel for payment in step 702, the rear-end equipment in the voucher center determines the historical channel for payment of the user as the recommended service processing channel, returns the recommended service processing channel to the front-end equipment in the voucher center, and performs step 708; and if the user is judged to have no historical channel for payment in step 702, the rear-end equipment in the voucher center performs step 707 in order to continue to determine a recommended service processing channel from other payment channels.

Step 707: The rear-end equipment in the voucher center designates a default service processing channel as the recommended service processing channel.

In this step, the specific method for designating a default service processing channel is not limited in this embodiment. For example, the rear-end equipment in the voucher center designates a payment channel with the highest successful probability currently as the default service processing channel, designates the default service processing channel as the recommended service processing channel, and returns the recommended service processing channel to the front-end equipment in the voucher center.

Step 708: The front-end equipment in the voucher center receives the recommended service processing channel returned by the rear-end equipment, and renders the content of the recommended service processing channel.

It should be noted that the front-end equipment in the voucher center will continue to perform step 407 and step 408 as mentioned in the above-described embodiment to continue to process the service to be processed after rendering the content of the recommended service processing channel.

For the method according to this embodiment, by determining a recommended service processing channel according to information about a service to be processed, and then sending the content of the recommended service processing channel to the front-end equipment such that the front-end equipment displays the content of the recommended service processing channel, the number of service processing channels displayed by the front-end equipment is reduced, and thus the time required to process services is reduced and the probability of processing services successfully is increased.

Figure 8:
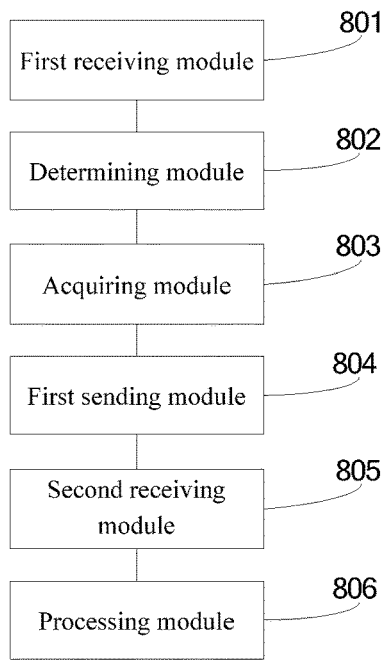
FIG. 8 is a schematic structural diagram of a first apparatus for processing services according to an embodiment of the present disclosure.

An embodiment of the present disclosure provides an apparatus for processing services, applicable to a rear-end equipment for processing services. The apparatus is configured to perform the method for processing services as described in any one of embodiments of FIG. 2 to FIG. 7. Referring to FIG. 8, the apparatus according to this embodiment includes:

a first receiving module 801, configured to receive a service processing request from a front-end equipment for processing services, the service processing request being carried with information about a service to be processed;

a determining module 802, configured to determine a recommended service processing channel according to the information about the service to be processed received by the first receiving module 801;

an acquiring module 803, configured to acquire content of the recommended service processing channel determined by the determining module 802;

a first sending module 804, configured to send the content of the recommended service processing channel acquired by the acquiring module 803 to the front-end equipment such that the front-end equipment displays the content of the recommended service processing channel;

a second receiving module 805, configured to receive a service acknowledgment from the front-end equipment; and a processing module 806, configured to process the service to be processed according to the service acknowledgment received by the second receiving module 805.

Preferably, the determining module 802 is further configured to search a channel matching the information about the service to be processed from the existing service processing channels according to user information, and use the searched channel as the recommended service processing channel.

Preferably, the information about the service to be processed received by the first receiving module 801 includes at least amount to be paid for the service to be processed and the content of the service to be processed.

Figure 9:
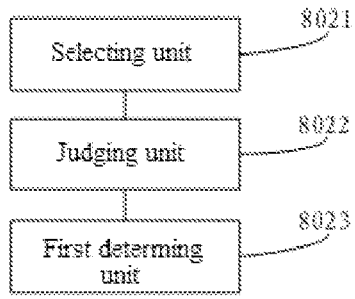
FIG. 9 is a schematic structural diagram of a first determining module according to an embodiment of the present disclosure.

Referring to FIG. 9, the determining module 802 includes:

a selecting unit 8021, configured to select a service processing channel from the existing service processing channels;

a judging unit 8022, configured to judge whether the currently selected service processing channel matches the information about the service to be processed according to user information; and a first determining unit 8023, configured to stop searching and use the channel matching the information about the service to be processed as the recommended service processing channel if the currently selected service processing channel matches the information about the service to be processed.

Preferably, the selecting unit 8021 is configured to determine an order of the existing service processing channels according to user's habits, preset default rules or the balance of the existing service processing channels; and select a service processing channel from the existing service processing channels according to the order of the existing service processing channels.

Figure 10:
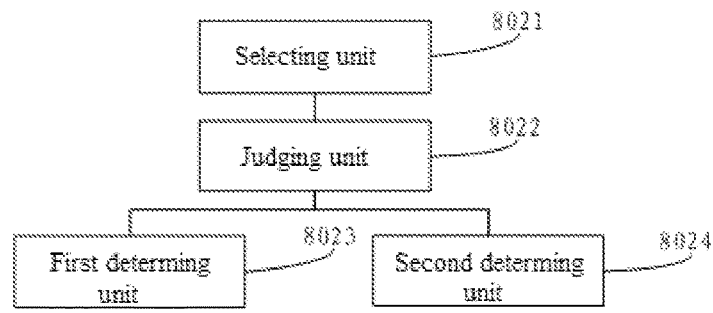
FIG. 10 is a schematic structural diagram of a second determining module according to an embodiment of the present disclosure.

Referring to FIG. 10, the determining module 802 further includes:

a second determining unit 8024, configured to: when the currently selected service processing channel does not match the information about the service to be processed, continue to search a next service processing channel until a service processing channel matching the information about the service to be processed is searched; and use the channel matching the information about the service to be processed as the recommended service processing channel.

Preferably, the acquiring module 803 is configured to judge whether the recommended service processing channel is a service processing channel provided by a third party; and establish connection with the third party via a cross-domain message interface and acquire the content of the recommended service processing channel from the third party when the recommended service processing channel is a service processing channel provided by a third party.

Figure 11:
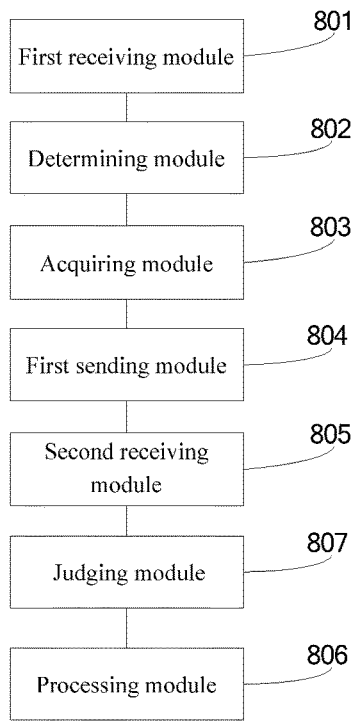
FIG. 11 is a schematic structural diagram of a second apparatus for processing services according to an embodiment of the present disclosure.

Referring to FIG. 11, the apparatus further includes: a judging module 807, configured to judge whether the service acknowledgment is correct. The processing module 806 is configured to process the service to be processed according to the service acknowledgment when the service acknowledgment is correct.

Figure 12:
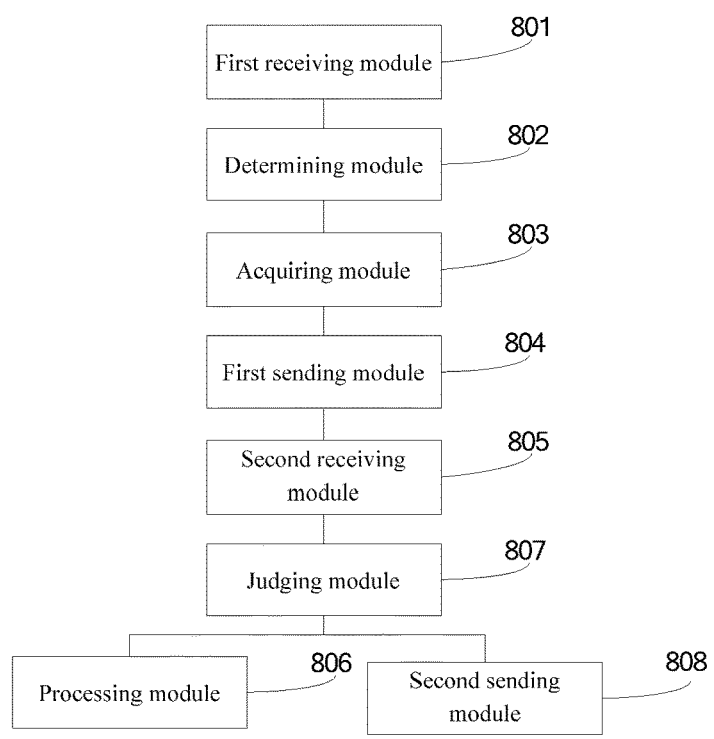
FIG. 12 is a schematic structural diagram of a third apparatus for processing services according to an embodiment of the present disclosure.

Referring to FIG. 12, the apparatus further includes: a second sending module 808, configured to send error information corresponding to the service acknowledgment to the front-end equipment for processing services when the service acknowledgment is incorrect, such that the front-end equipment for processing services displays the error information.

For the apparatus according to this embodiment, by determining a recommended service processing channel according to information about a service to be processed, and then sending the content of the recommended service processing channel to the front-end equipment such that the front-end equipment displays the content of the recommended service processing channel, the number of service processing channels displayed by the front-end equipment is reduced, and thus the time required to process services is reduced and the probability of processing services successfully is increased.

Figure 13:
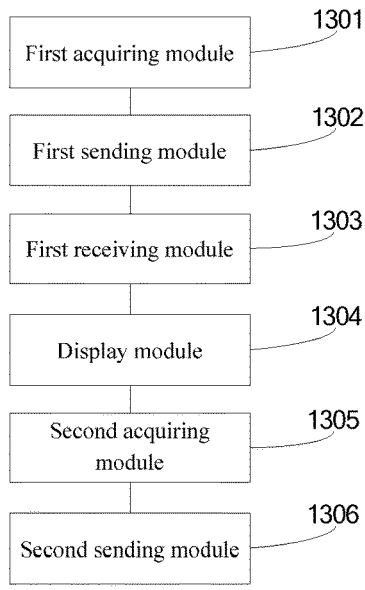
FIG. 13 is a schematic structural diagram of a first apparatus for processing services according to an embodiment of the present disclosure.

An embodiment of the present disclosure provides an apparatus for processing services, applicable to a front-end equipment for processing services. The apparatus is configured to perform the method for processing services as described in any one of embodiments of FIG. 2 to FIG. 7. Referring to FIG. 13, the apparatus includes:

a first acquiring module 1301, configured to acquire information about a service to be processed;

a first sending module 1302, configured to send a service processing request to a rear-end equipment for processing services, the service processing request being carried with information about the service to be processed;

a first receiving module 1303, configured to receive the content of a recommended service processing channel from the rear-end equipment;

a display module 1304, configured to display the content of the recommended service processing channel;

a second acquiring module 1305, configured to acquire service acknowledgement information; and a second sending module 1306, configured to send the service acknowledgement information acquired by the second acquiring module 1305 to the rear-end equipment, such that the rear-end equipment processes the service to be processed according to the service acknowledgement information.

Preferably, the information about the service to be processed acquired by the first acquiring module 1303 at least includes amount to be paid for the service to be processed and the content of the service to be processed.

Preferably, the display module 1304 is configured to judge whether the content of the recommended service processing channel is the content of a channel provided by a third party; and embed the content of the recommended service processing channel into the current display interface for display when the content of the recommended service processing channel is the content of a channel provided by a third party.

Figure 14:
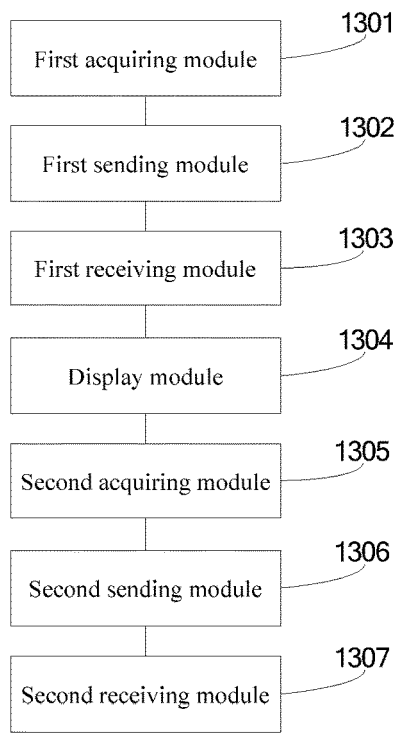
FIG. 14 is a schematic structural diagram of a second apparatus for processing services according to an embodiment of the present disclosure.

Referring to FIG. 14, the apparatus further includes: a second receiving module 1307, configured to receive error information corresponding to the service acknowledgement information received from the rear-end equipment. The display module 1304 is configured to display the error information.

For the apparatus according to this embodiment, by receiving the content of a recommended service processing channel, one determined by the rear-end equipment according to the information about a service to be processed, from the rear-end equipment, and by displaying the content of the recommended service processing channel, the number of service processing channels displayed by the front-end equipment is reduced, and thus the time required to process services is reduced and the probability of processing services successfully is increased.

Figure 15:
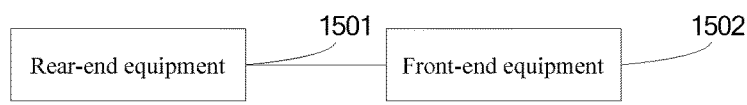
FIG. 15 is a schematic structural diagram of a system for processing services according to an embodiment of the present disclosure.

An embodiment of the present disclosure provides a system for processing services. The system is configured to perform the method for processing services as described in any one of embodiments of FIG. 2 to FIG. 7. Referring to FIG. 15, the system includes: a rear-end equipment 1501 for processing services and a front-end equipment 1502 for processing services.

A first device for processing services runs in the rear-end equipment 1501 for processing services, and a second device for processing services runs in the front-end equipment 1502 for processing services. The first device for processing services is the device as illustrated in the above-described embodiment, referring to the above-described embodiment for details. The second device for processing services is the device as illustrated in the above-described embodiment, referring to the above-described embodiment for details.

For the system according to this embodiment, by determining a recommended service processing channel according to information about a service to be processed, and then sending the content of the recommended service processing channel to the front-end equipment such that the front-end equipment displays the content of the recommended service processing channel, the number of service processing channels displayed by the front-end equipment is reduced, and thus the time for processing services is reduced and the probability of processing services successfully is increased.

Figure 16:
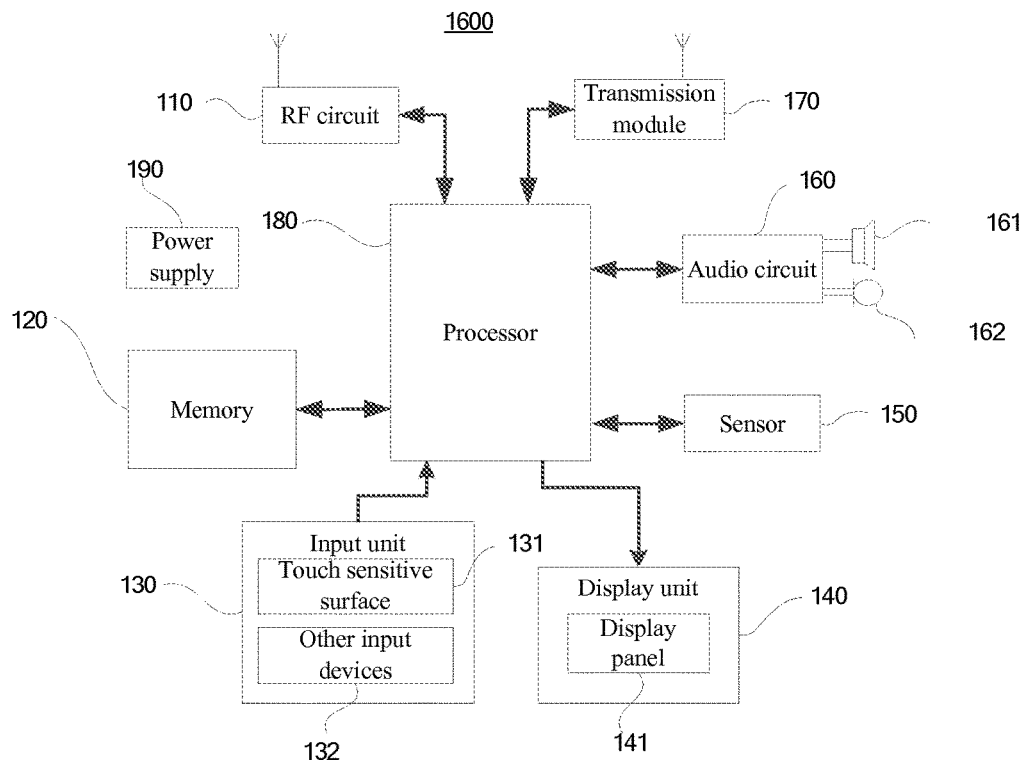
FIG. 16 is a schematic structural diagram of a terminal according to an embodiment of the present disclosure.

Referring to FIG. 16, an embodiment of the present disclosure provides a terminal. FIG. 16 is a schematic structural diagram of a terminal having a touch sensitive surface an embodiment of the present disclosure. The terminal may be configured to implement the method for processing services in any one of embodiments of FIG. 2 to FIG. 7.

The terminal 1600 may include a radio frequency (RF) circuit 110, a memory 120 having one or more non-transitory computer-readable storage media, an input unit 130, a display unit 140, a sensor 150, an audio circuit 160, a transmission module 170, a processor 180 having one or more processing cores, a power supply 190 and the like. It should be understood by those skilled in the art that the structure of the terminal illustrated in FIG. 16 is not intended to limit the terminal, and the terminal may include more or less components than those illustrated in the figure, or combinations of some components, or different arrangements of the components.

The RF circuit 110 may be configured to receive and send signals during the process of receiving/sending a message or during a call. Particularly, the RF circuit 110 receives and delivers downlink information of a base station to one or more processors 180 for processing; in addition, the RF circuit 110 sends the related uplink data to the base station. In general, the RF circuit 110 includes, but is not limited to, antennas, at least one amplifier, a tuner, one or more oscillators, a subscriber identity module (SIM) card, a transceiver, a coupler, a low noise amplifier (LNA), a duplexer and the like. Besides, the RF circuit 110 may also communicate with other equipments via wireless communication and network. The radio communication may use any one of communication standards or protocols, including, but not limited to, Global System of Mobile Communications (GSM), General Packet Radio Service (GPRS), Code Division Multiple Access (CDMA), Wideband Code Division Multiple Access (WCDMA), Long Term Evolution (LTE), E-mail, Short Messaging Service (SMS), and the like The memory 120 may be configured to store software programs and modules, such as software programs and modules corresponding to the rear-end equipment for processing services and the front-end equipment for processing services in an above-described embodiment. The processor 180 executes various functional applications and data processing, for example, processing services, by running the software programs and modules stored in the memory 120. The memory 120 may mainly include a program storage area and a data storage area, where the program storage area may store operating systems, applications required by at least one function (for example, function of playing voice, function of playing images, and the like) and the like; and the data storage area may store data (for example, voice data, telephone book, and the like) created according to the use of the terminal 1600, and the like. Furthermore, the memory 120 may include a high-speed random access memory, and may also include a nonvolatile memory, for example, at least one disk storage device, a flash memory or other volatile solid-state storage devices. Correspondingly, the memory 120 may also include a memory controller for providing the access to the memory 120 for the processor 180 and the input unit 130.

The input unit 130 may be configured to receive input numeric or character information, and generate signal input of a keyboard, a mouse, an operating bar, an optical or track ball associated with user settings and function controls. Specifically, the input unit 130 may include a touch sensitive surface 131 and other input equipments 132. The touch sensitive surface 131, also known as touch display screen or touchpad, may collect touch operations of a user over or nearby the touch sensitive surface 131 (for example, operations performed by a user over or nearby the touch sensitive surface 131 via a finger, a stylus or any other suitable objects or accessories), and drive a corresponding connection device according to a preset program. Optionally, the touch sensitive surface 131 may include a touch detector and a touch controller. Wherein, the touch detector detects the touch orientation of a user, detects a signal resulted from a touch operation, and then transmits the signal to the touch controller. The touch controller receives touch information from the touch detector, converts the touch information into coordinates of a touch point, and then sends the coordinates to the processor 180. The touch controller can also receive and execute a command from the processor 180. In addition, the touch sensitive surface 131 may be implemented as a resistive touch sensitive surface, a capacitive touch sensitive surface, an infrared touch sensitive surface, a surface acoustic wave touch sensitive surface or other touch sensitive surfaces. In addition to the touch sensitive surface 131, the input unit 130 may also include other input equipments 132. Specifically, the other input equipments 132 may include, but are not limited to, one or more of a physical keyboard, function keys (such as, a volume control key, a switch key, and the like), a track ball, a mouse, an operating bar, and the like.

The display unit 140 may be configured to display information input by a user or information provided to the user and various graphic user interfaces of the terminal 1600. These graphic user interfaces may consist of graphs, texts, icons, videos and any combination thereof. The display unit 140 may include a display panel 141. Optionally, the display unit 140 may be configured to a liquid crystal display (LCD), or an organic light-emitting diode (OLED), or the like. Further, the touch sensitive surface 131 may cover the display panel 141. After detecting a touch operation over or nearby the touch sensitive surface 131, the touch sensitive surface 131 transmits the touch operation to the processor 180 to determine the type of the touch event. Subsequently, the processor 180 provides corresponding visual output on the display panel 141 according to the type of the touch event. Although the touch sensitive surface 131 and the display panel 141 are regarded as two independent components to realize input and output functions in FIG. 16, the touch sensitive surface 131 and the display panel 141 may be integrated to realize the input and output functions in some embodiments.

The terminal 1600 may further include at least one sensor 150, for example, an optical sensor, a motion sensor and other sensors. Specifically, the optical sensor may include an ambient optical sensor and a proximity sensor, where the ambient optical sensor may adjust the brightness of the display panel 141 according to the ambient light, and the proximity sensor may close and/or backlight the display panel 141 when the terminal 1600 is moved to ears. As one of motion sensors, a gravity acceleration sensor may detect the magnitude of acceleration in each direction (three axes, generally), may detect the magnitude and direction of the gravity when in standstill, and may be applicable to applications identifying mobile phone postures (for example, switchover of the horizontal screen and the vertical screen, related games, magnetometer posture calibration) and vibration identification associated functions (for example, pedometer, knock) and the like Other sensors, such as, gyroscopes, barometers, hygrometers, thermometers and infrared sensors may also be configured in the terminal 1600 and will not be described repeatedly here.

The audio circuit 160, a loudspeaker 161 and a microphone 162 may provide audio interfaces between the user and the terminal 1600. The audio circuit 160 may convert the received audio data into electric signals and then transmit the electric signals to the loudspeaker 161; and then, the electric signals are converted by the loudspeaker 161 into acoustical signals and then output. Meanwhile, the microphone 162 converts the collected acoustical signals into electric signals; the electric signals are received and converted by the audio circuit 160 into audio data; and then the audio data is output to the processor 180 to be processed and then sent to, for example, another terminal, via the RF circuit 110, or output to the memory 120 for further processing. The audio circuit 160 may further include a headset jack in order to provide communication between a peripheral headset and the terminal 1600.

The terminal 1600 may assist a user to receive or send E-mails, browse webpage and access streaming media via the transmission module 170, thereby providing the access to wireless or wired wideband Internet for the user. Although, the transmission module 170 is illustrated in FIG. 16, it may be understood that the transmission module 170 is not a necessary constituent of the terminal 800 and may be omitted as required without changing the scope of the essence of the present disclosure.

As a control center of the terminal 1600, the processor 180 connects all components of the whole mobile phone together via various interfaces and lines, and implements various functions of the terminal 1600 and processes data by running or executing the software programs and/or modules stored in the memory 120 and by invoking the data stored in the memory 120, and thus monitoring the mobile phone as a whole. Optionally, the processor 180 may include one or more processing cores; and preferably, the processor 180 may integrate an application processor and a modulation/demodulation processor, where the application processor mainly processes operating systems, user interfaces and applications, and the like, while the modulation/demodulation processor mainly processes wireless communication. Understandably, the modulation/demodulation processor may also be not integrated in the processor 180.

The terminal 1600 may further include a power supply 190 (for example, a cell) for supplying power to all components. Preferably, the power supply may be in logic connection with the processor 180 via a power management system so as to realize charge, discharge, power consumption management and other functions via the power management system. The power supply 190 may also include one or more DC or AC power supplies, a recharge system, a power failure detection circuit, a power converter or inverter, a power status indicator or any other components.

Although not illustrated, the terminal 1600 may further include a camera, a Bluetooth module and the like, which will not be repeated here. Specifically, in this embodiment, the display unit of the terminal is a touch-screen display. The terminal further includes a memory and one or more programs, where the one or more programs are stored in the memory and may be configured to be used by one or more processors to execute instructions contained in the one or more programs, the instructions being used for performing operations to be executed by a back-end equipment for processing services in any one of embodiments of FIG. 2 to FIG. 7.

In conclusion, for the terminal according to this embodiment, by determining a recommended service processing channel according to information about a service to be processed, and then sending the content of the recommended service processing channel to the front-end equipment such that the front-end equipment displays the content of the recommended service processing channel, the number of service processing channels displayed by the front-end equipment is reduced, and thus the time for processing services is reduced and the probability of processing services successfully is increased.

An embodiment of the present disclosure provides a non-transitory computer-readable storage medium. The non-transitory computer-readable may be a non-transitory computer-readable storage medium contained in the memory in the above embodiment, or non-transitory computer-readable storage medium that is separate and not assembled in the terminal. The non-transitory computer-readable storage medium stores one or more programs used by one or more processors to perform a method for processing services, to be executed by a back-end equipment for processing services in any one of embodiments of FIG. 2 to FIG. 7

For the non-transitory computer-readable storage medium according to the embodiment of the present disclosure, by determining a recommended service processing channel according to information about a service to be processed, and then sending the content of the recommended service processing channel to the front-end equipment such that the front-end equipment displays the content of the recommended service processing channel, the number of service processing channels displayed by the front-end equipment is reduced, thus the time for processing services is reduced and the probability of processing services successfully is increased.

An embodiment of the present disclosure of the present disclosure provides a graphic user interface, applied to a terminal having a touch-screen display, a memory and one or more processors for executing one or more programs, the processors being used for performing a method for processing services, to be executed by a back-end equipment for processing services in any one of embodiments 1 to 3.

For the graphic user interface according to the embodiment of the present disclosure, by determining a recommended service processing channel according to information about a service to be processed, and then sending the content of the recommended service processing channel to the front-end equipment such that the front-end equipment displays the content of the recommended service processing channel, the number of service processing channels displayed by the front-end equipment is reduced, and thus the time for processing services is reduced and the probability of processing services successfully is increased.

Figure 17:
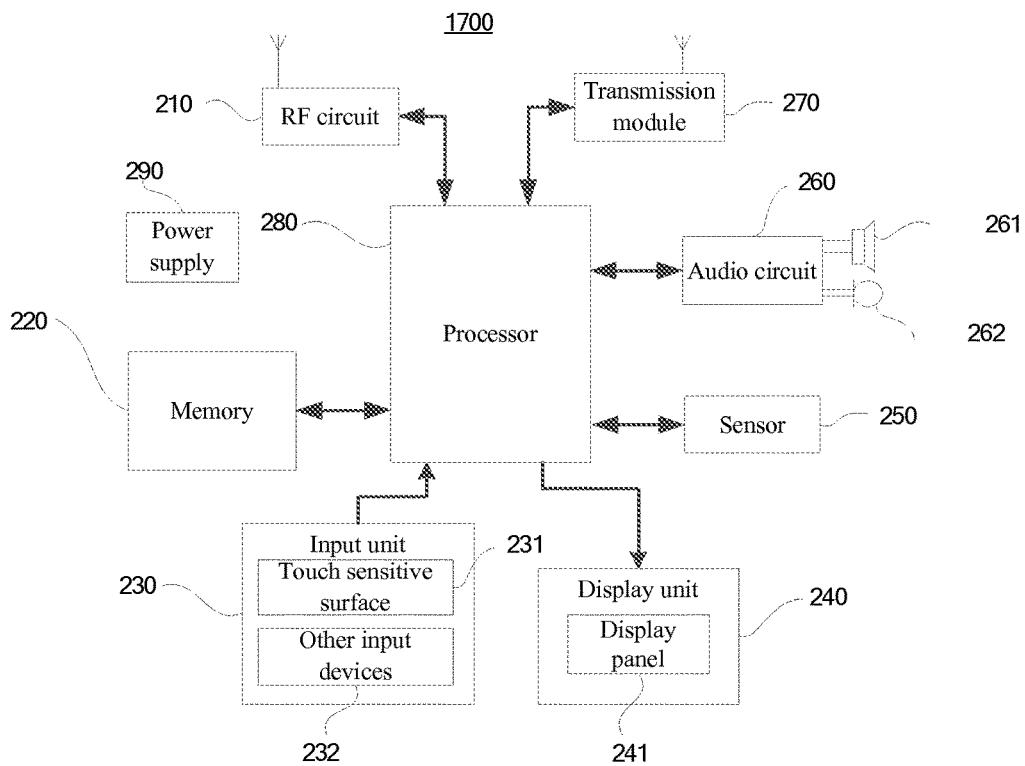
FIG. 17 is a schematic structural diagram of a terminal according to an embodiment of the present disclosure.

Referring to FIG. 17, an embodiment of the present disclosure provides a terminal. FIG. 17 shows a structure diagram of a terminal having a touch sensitive surface according to embodiments of the present disclosure. The terminal may be configured to implement the method for processing services in any one of embodiments of FIG. 2 to FIG. 7.

The terminal 1700 may include an RF circuit 210, a memory 220 having one or more non-transitory computer-readable storage media, an input unit 230, a display unit 240, a sensor 250, an audio circuit 260, a transmission module 270, a processor 280 having one or more processing cores, a power supply 290 and the like. It should be understood by those skilled in the art that the structure of the terminal 1700 illustrated in FIG. 17 is not intended to limit the terminal 1700, and the terminal 1700 may include more or less components than those illustrated in the figure, or combinations of some components, or different arrangements of the components. Wherein:

The RF circuit 210 may be configured to receive and send signals during the process of receiving/sending a message or during a call. Particularly, the RF circuit 210 receives and delivers downlink information of a base station to one or more processors 280 for processing; in addition, the RF circuit 210 sends the related uplink data to the base station. In general, the RF circuit 210 includes, but is not limited to, antennas, at least one amplifier, a tuner, one or more oscillators, a Subscriber Identity Module (SIM) card, a transceiver, a coupler, an LNA (Low Noise Amplifier), a duplexer and the like. Besides, the RF circuit 210 may also communicate with other equipments via wireless communication and network. The radio communication may use any one of communication standards or protocols, including, but not limited to, GSM, GPRS, CDMA, WCDMA, LTE, E-mail, SMS, and the like.

The memory 220 may be configured to store software programs and modules, such as software programs and modules corresponding to the rear-end equipment for processing services and the front-end equipment for processing services in an above-described embodiment. The processor 280 executes various functional applications and data processing, for example, processing services, by running the software programs and modules stored in the memory 220. The memory 220 may mainly include a program storage area and a data storage area, where the program storage area may store operating systems, applications required by at least one function (for example, function of playing voice, function of playing images, and the like) and the like; and the data storage area may store data (for example, voice data, telephone book, and the like) created according to the use of the terminal 1700, and the like. Furthermore, the memory 220 may include a high-speed random access memory, and may also include a nonvolatile memory, for example, at least one disk storage device, a flash memory or other volatile solid-state storage devices. Correspondingly, the memory 220 may also include a memory controller for providing the access to the memory 220 for the processor 280 and the input unit 230.

The input unit 230 may be configured to receive input numeric or character information, and generate signal input of a keyboard, a mouse, an operating bar, an optical or track ball associated with user settings and function controls. Specifically, the input unit 230 may include a touch sensitive surface 231 and other input equipments 232. The touch sensitive surface 231, also known as touch display screen or touchpad, may collect touch operations of a user over or nearby the touch sensitive surface 231 (for example, operations performed by a user over or nearby the touch sensitive surface 231 via a finger, a stylus or any other suitable objects or accessories), and drive a corresponding connection device according to a preset program. Optionally, the touch sensitive surface 231 may include a touch detector and a touch controller. Wherein, the touch detector detects the touch orientation of a user, detects a signal resulted from a touch operation, and then transmits the signal to the touch controller. The touch controller receives touch information from the touch detector, converts the touch information into coordinates of a touch point, and then sends the coordinates to the processor 280. The touch controller can also receive and execute a command from the processor 280. In addition, the touch sensitive surface 231 may be implemented as a resistive touch sensitive surface, a capacitive touch sensitive surface, an infrared touch sensitive surface, a surface acoustic wave touch sensitive surface or other touch sensitive surfaces. In addition to the touch sensitive surface 231, the input unit 230 may also include other input equipments 232. Specifically, the other input equipments 232 may include, but are not limited to, one or more of a physical keyboard, function keys (such as, a volume control key, a switch key, and the like), a track ball, a mouse, an operating bar, and the like.

The display unit 240 may be configured to display information input by a user or information provided to the user and various graphic user interfaces of the terminal 1700. These graphic user interfaces may consist of graphs, texts, icons, videos and any combination thereof. The display unit 240 may include a display panel 241. Optionally, the display unit 240 may be configured of an LCD, or an OLED, or the like. Further, the touch sensitive surface 231 may cover the display panel 241. After detecting a touch operation over or nearby the touch sensitive surface 231, the touch sensitive surface 231 transmits the touch operation to the processor 280 to determine the type of the touch event. Subsequently, the processor 280 provides corresponding visual output on the display panel 241 according to the type of the touch event. Although the touch sensitive surface 231 and the display panel 241 are regarded as two independent components to realize input and output functions in FIG. 17, the touch sensitive surface 231 and the display panel 241 may be integrated to realize the input and output functions in some embodiments.

The terminal 1700 may further include at least one sensor 250, for example, an optical sensor, a motion sensor and other sensors. Specifically, the optical sensor may include an ambient optical sensor and a proximity sensor, where the ambient optical sensor may adjust the brightness of the display panel 241 according to the ambient light, and the proximity sensor may close and/or backlight the display panel 241 when the terminal 1700 is moved to ears. As one of motion sensors, a gravity acceleration sensor may detect the magnitude of acceleration in each direction (three axes, generally), may detect the magnitude and direction of the gravity when in standstill, and may be applicable to applications identifying mobile phone postures (for example, switchover of the horizontal screen and the vertical screen, related games, magnetometer posture calibration) and vibration identification associated functions (for example, pedometer, knock) and the like Other sensors, such as, gyroscopes, barometers, hygrometers, thermometers and infrared sensors may also be configured in the terminal 1700 and will not be described repeatedly here.

The audio circuit 260, a loudspeaker 261 and a microphone 262 may provide audio interfaces between the user and the terminal 1700. The audio circuit 260 may convert the received audio data into electric signals and then transmit the electric signals to the loudspeaker 261; and then, the electric signals are converted by the loudspeaker 261 into acoustical signals and then output. Meanwhile, the microphone 262 converts the collected acoustical signals into electric signals; the electric signals are received and converted by the audio circuit 260 into audio data; and then the audio data is output to the processor 280 to be processed and then sent to, for example, another terminal 1700, via the RF circuit 210, or output to the memory 220 for further processing. The audio circuit 260 may further include a headset jack in order to provide communication between a peripheral headset and the terminal 1700.

The terminal 1700 may assist a user to receive or send E-mails, browse webpage and access streaming media via the transmission module 270, thereby providing the access to wireless or wired wideband Internet for the user. Although, the transmission module 270 is illustrated in FIG. 17, it may be understood that the transmission module 270 is not a necessary constituent of the terminal 1700 and may be omitted as required without changing the scope of the essence of the present disclosure.

As a control center of the terminal 1700, the processor 280 connects all components of the whole mobile phone together via various interfaces and lines, and implements various functions of the terminal 1700 and processes data by running or executing the software programs and/or modules stored in the memory 220 and by invoking the data stored in the memory 220, and thus monitoring the mobile phone as a whole. Optionally, the processor 280 may include one or more processing cores; and preferably, the processor 280 may integrate an application processor and a modulation/demodulation processor, where the application processor mainly processes operating systems, user interfaces and applications, and the like, while the modulation/demodulation processor mainly processes wireless communication. Understandably, the modulation/demodulation processor may also be not integrated in the processor 280.

The terminal 1700 may further include a power supply 290 (for example, a cell) for supplying power to all components. Preferably, the power supply may be in logic connection with the processor 280 via a power management system so as to realize charge, discharge, power consumption management and other functions via the power management system. The power supply 290 may also include one or more DC or AC power supplies, a recharge system, a power failure detection circuit, a power converter or inverter, a power status indicator or any other components.

Although not illustrated, the terminal 1700 may further include a camera, a Bluetooth module and the like, which will not be repeated here. Specifically, in this embodiment, the display unit of the terminal 1700 is a touch-screen display. The terminal 1700 further includes a memory and one or more programs, where the one or more programs are stored in the memory and are configured to be used by one or more processors to execute instructions contained in the one or more programs, the instructions being used for performing operations to be executed by a front-end equipment for processing services in any one of embodiments of FIG. 2 to FIG. 7.

In conclusion, for the terminal according to this embodiment, by receiving the content of a recommended service processing channel, one determined by the rear-end equipment according to the information about a service to be processed, from the rear-end equipment, and by displaying the content of the recommended service processing channel, the number of service processing channels displayed by the front-end equipment is reduced, and thus the time required to process services is reduced and the probability of processing services successfully is increased.

An embodiment of the present disclosure provides a non-transitory computer-readable storage medium. The non-transitory computer-readable storage medium may be the non-transitory computer-readable storage medium contained in the memory in the above embodiment, or a non-transitory computer-readable storage medium that is separate and not assembled in the terminal. The non-transitory computer-readable storage medium stores one or more programs used by one or more processors to perform a method for processing services, to be executed by a front-end equipment for processing services in any one of embodiments of FIG. 2 to FIG. 7.

For the computer-readable storage medium according to this embodiment, by receiving the content of a recommended service processing channel, one determined by the rear-end equipment according to the information about a service to be processed, from the rear-end equipment, and by displaying the content of the recommended service processing channel, the number of service processing channels displayed by the front-end equipment is reduced, and thus the time required to process services is reduced and the probability of processing services successfully is increased.

An embodiment of the present disclosure provides a graphic user interface, applied to a terminal having a touchscreen display, a memory and one or more processors for executing one or more programs, the processors being used for performing a method for processing services, to be executed by a front-end equipment for processing services in any one of embodiments of FIG. 2 to FIG. 7.

For the graphic user interface according to the embodiment of the present disclosure, by receiving the content of a recommended service processing channel, one determined by the rear-end equipment according to the information about a service to be processed, from the rear-end equipment, and by displaying the content of the recommended service processing channel, the number of service processing channels displayed by the front-end equipment is reduced, and thus the time required to process services is reduced and the probability of processing services successfully is increased.

It should be noted that when the rear-end equipment and the front-end equipment provided in the above embodiments process services, the process is illustrated through the division of the above all functional modules by way of example only. However, in actual applications, the above functions may be implemented by different functional modules according to actual need, that is, the internal structures of the rear-end equipment and the front-end equipment may be divided into different functional modules for completing all or part of the functions described above. In addition, the embodiments of the rear-end equipment, the front-end equipment and the system according to the above embodiments and the embodiments of the method for processing services are based on the same inventive concept. The specific implementation process is disclosed in the embodiments of the method and will not be repeated here.

The sequence numbers of the above embodiments of the present disclosure are merely for description purpose but do not indicate the preference of the embodiments.

Persons of ordinary skill in the art should understand that all or part of the steps in the foregoing embodiments may be implemented by using hardware or programs instructing relevant hardware. The program may be stored in a non-transitory computer-readable storage medium, and may be executed by one or more processors. The non-transitory computer-readable storage medium may be a read-only memory, a magnetic disk, a compact-disc read only memory, and the like.

The foregoing descriptions are merely preferred embodiments of the present disclosure, and are not intended to limit the present disclosure. Any modifications, equivalent replacements and improvements made within the spirit and principle of the present disclosure shall fall into the protection scope of the present disclosure.

What is claimed is:

1. A method comprising:
   receiving by a server, a service processing request from a front-end equipment which connects to the server via a network, the service processing request including information about a payment service to be processed, a content of a purchase, and an amount of the purchase;
   determining, by the server, an order of a plurality of existing payment service processing channels according to a use habit of a user making the service processing request or a user's remaining balance on each of the plurality of existing payment service processing channels;
   automatically selecting, by the server, a payment channel from among the plurality of existing payment channels based on the order that is determined and the information included in the service processing request, as a recommended payment service processing channel, and acquiring content of the recommended payment service processing channel;
   sending, by the server, only the content of the recommended payment service processing channel to the front-end equipment such that the front-end equipment only displays the content of the recommended payment service processing channel;
   receiving, by the server, a service acknowledgment from the front-end equipment; and
   processing the service to be processed according to the service acknowledgment.

2. The method according to claim 1, wherein the acquiring content of the recommended service payment processing channel comprises:
   judging whether the recommended payment service processing channel is a payment service processing channel provided by a third party; and
   establishing a connection with the third party via a cross-domain message interface and acquiring the content of the recommended payment service processing channel from the third party when the recommended service processing channel is the payment service processing channel provided by the third party.

3. The method according to claim 1, further comprising:
   judging whether the service acknowledgment is correct; and
   processing the service to be processed according to the service acknowledgment if the service acknowledgment is correct.

4. The method according to claim 3, further comprising:
   sending error information corresponding to the service acknowledgment to the front-end equipment for processing services if the service acknowledgment is incorrect, such that the front-end equipment for processing services displays the error information.

5. A server comprising:
   at least one memory configured to store computer program code; and
   at least one processor configured to access the at least one memory and operate according to the computer program code, the computer program code including:
   reception code configured to cause at least one of the at least one processor to receive a service processing request from a front-end equipment which connects to the server via a network, the service processing request including information about a payment service to be processed, a content of a purchase, and an amount of the purchase;
   determining code configured to cause at least one of the at least one processor to determine an order of a plurality of existing payment service processing channels according to a use habit of a user making the service processing request or a user's remaining balance on each of the plurality of existing payment service processing channels,
   selecting code configured to cause at least one of the at least one processor to automatically select a payment channel from among the plurality of existing payment channels based on the order that is determined and the information included in the service processing request, as a recommended payment service processing channel;

acquiring code configured to cause at least one of the at least one processor to acquire content of the recommended payment service processing channel;

sending code configured to cause at least one of the at least one processor to send only the content of the recommended payment service processing channel to the front-end equipment such that the front-end equipment only displays the content of the recommended payment service processing channel;

receiving code configured to cause at least one of the at least one processor to receive a service acknowledgment from the front-end equipment; and processing code configured to cause at least one of the at least one processor to process the service to be processed according to the service acknowledgment received by the second receiving module.

6. The server according to claim 5, wherein the computer program code further comprises:

judging code configured to cause at least one of the at least one processor to judge whether the recommended payment service processing channel is a payment service processing channel provided by a third party; and establish connection with the third party via a cross-domain message interface and acquire the content of the recommended payment service processing channel from the third party when the recommended service processing channel is a payment service processing channel provided by a third party.

7. The server according to claim 5, wherein the computer program code further comprises:

judging code configured to cause at least one of the at least one processor to judge whether the service acknowledgment is correct;

service processing code configured to cause at least one of the at least one processor to process the service to be processed according to the service acknowledgment when the service acknowledgment is correct.

8. The server according to claim 5, wherein the computer program code further comprises:

error sending code configured to cause at least one of the at least one processor to send error information corresponding to the service acknowledgment to the front-end equipment for processing services when the service acknowledgment is incorrect, such that the front-end equipment for processing services displays the error information.

9. A system comprising:

a front-end equipment; and a server which connects to the front-end equipment via a network for processing services, wherein the front-end equipment comprises:

at least one front-end memory configured to store front-end computer program code; and at least one front-end processor configured to access the at least one front-end memory and operate according to the front-end computer program code, the front-end computer program code including:

front-end acquiring code configured to cause at least one of the at least one processor to acquire information about a service to be processed, and send, to the server, a service processing request including information about a payment service to be processed, a content of a purchase, and an amount of the purchase;

front-end receiving code configured to cause at least one of the at least one processor to receive content of a recommended payment service processing channel from the server, and only display the content of the recommended payment service processing channel; and front-end acknowledgement code configured to cause at least one of the at least one processor to acquire a service acknowledgment, and send the service acknowledgment to the server to process the service to be processed according to the service acknowledgment, and wherein the server comprises:

reception code configured to cause at least one of the at least one processor to receive the service processing request from the front-end equipment;

determining code configured to cause at least one of the at least one processor to determine an order of a plurality of existing payment service processing channels according to a use habit of a user making the service processing request or a user's remaining balance on each of the plurality of existing payment service processing channels, selecting code configured to cause at least one of the at least one processor to automatically select a payment channel from among the plurality of existing payment channels based on the order that is determined and the information included in the service processing request, as a recommended payment service processing channel;

acquiring code configured to cause at least one of the at least one processor to acquire content of the recommended payment service processing channel;

sending code configured to cause at least one of the at least one processor to send only the content of the recommended payment service processing channel to the front-end equipment such that the front-end equipment only displays the content of the recommended payment service processing channel;

receiving code configured to cause at least one of the at least one processor to receive the service acknowledgment from the front-end equipment; and processing code configured to cause at least one of the at least one processor to process the service to be processed according to the service acknowledgment received by the second receiving module.

10. The method according to claim 1, wherein, the content of the recommended payment service processing channel is parameters required by the recommended service processing channel when the recommended payment service processing channel is a payment service processing channel not provided by a third party, and the content of the recommended payment service processing channel is URL distributed by the third party when the recommended payment service processing channel is a payment service processing channel provided by the third party.

11. The apparatus according to claim 5, wherein, the content of the recommended payment service processing channel is parameters required by the recommended service processing channel when the recommended payment service processing channel is a payment service processing channel not provided by a third party, and the content of the recommended payment service processing channel is URL distributed by the third party when the recommended payment service processing channel is a payment service processing channel provided by the third party.

\* \* \* \* \*